United States Patent [19]

Chow

[11] 4,234,658

[45] Nov. 18, 1980

[54] WOOD COMPOSITES WITH FOLIAGE ADHESIVE

[75] Inventor: Suezone Chow, Vancouver, Canada

[73] Assignee: Canadian Patents and Development Limited, Ottawa, Canada

[21] Appl. No.: 883,951

[22] Filed: Mar. 6, 1978

Related U.S. Application Data

[63] Continuation-in-part of Ser. No. 771,992, Feb. 25, 1977, Pat. No. 4,082,903.

[51] Int. Cl.³ .............................................. B32B 21/02
[52] U.S. Cl. ......................................... 428/403; 428/2; 428/528; 428/535; 428/537; 264/122; 156/62.2
[58] Field of Search ....................... 428/18, 24, 528, 2, 428/403, 537; 260/17.2; 424/196; 264/122; 156/62.2

[56] References Cited

U.S. PATENT DOCUMENTS

| | | | |
|---|---|---|---|
| 3,995,003 | 11/1976 | Potter et al. | 264/122 |
| 4,044,087 | 8/1977 | Robitschek et al. | 264/122 |
| 4,045,386 | 8/1977 | Hartman | 428/528 |
| 4,082,903 | 4/1978 | Chow | 428/514 |

*Primary Examiner*—George F. Lesmes
*Assistant Examiner*—E. Rollins Buffalow
*Attorney, Agent, or Firm*—Alan A. Thomson

[57] ABSTRACT

Wood can be hot-pressed into various composites using as adhesive subdivided plant foliage. Considerable bond strength is achieved, the bonds having water resistance adequate for many uses. The foliage is the primary adhesive i.e., is greater than 95% wt. of the active adhesive components present. The foliage can be used either in the form of a powder or as a dispersion in an aqueous liquid carrier. The foliage-wood system is hot-pressed to achieve the desired bonding, the pressing temperature being above the softening temperature of the foliage. The softening temperature of the foliage varies depending on the moisture content. The foliage proportions in the composite can range from about 1% to about 60% by wt. or more in some cases. Increased bond strengths have been achieved using formaldehyde crosslinking agents or alkaline additives.

17 Claims, 1 Drawing Figure

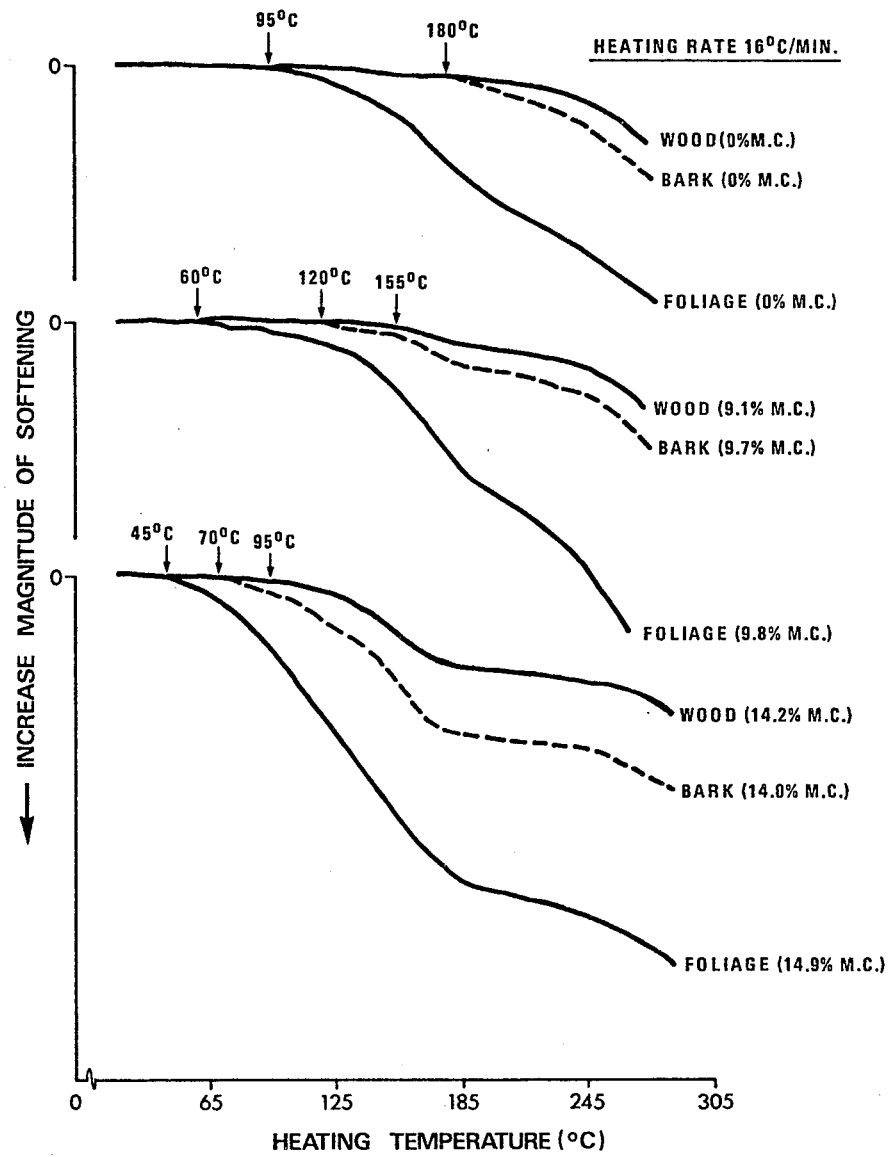

WOOD COMPOSITES WITH FOLIAGE ADHESIVE

RELATED APPLICATION

This application is a continuation-in-part of my application Ser. No. 771,992 filed Feb. 25, 1977 (now U.S. Pat. No. 4,082,903).

FIELD OF THE INVENTION

This invention deals with wood adhesives and the preparation of wood composites by hot pressing. Foliage in finely divided form has been found to be an effective adhesive for wood where hot pressing is carried out. The foliage adhesive is suitable for e.g., panel products such as particle board, waferboard and plywood, and other laminates. The foliage may be any plant foliage, with evergreen and deciduous tree foliage usually most suitable.

DESCRIPTION OF THE PRIOR ART

Wood adhesive formulations are usually based on synthetic resins such as phenol-aldehyde, urea-aldehyde, urea-melamine-aldehyde condensation products and polyvinyl acetate glues. These resins and glues are extended with additives which control the viscosity or other rheological properties, and which conserve moisture in the adhesive during assembly. In addition to the extender, a filler is normally incorporated in such formulations primarily to increase the bulk without unduly interfering with the curing and adhesion properties. In my copending application Ser. No. 771,992 mentioned above, I disclosed that finely divided foliage can function as extender or as extender-plus-filler in adhesive formulations. Amounts of foliage up to about 95% by wt. of the total adhesive solids were found operative in this earlier application.

On continuing my work with foliage, I found that the resin adhesive or glue was not essential when bonding wood with selected heat and pressure levels.

SUMMARY OF THE INVENTION

In accordance with this invention, finely-divided foliage is used as wood adhesive in hot-pressed composite wood products. The invention provides a method of bonding wood to form composite products comprising
 (a) subdividing plant foliage to a fine particle size;
 (b) uniformly contacting the finely-divided foliage with the wood to be bonded, the foliage being greater than 95% of the active adhesive components present by wt;
 (c) subjecting the crude composite to bonding pressure at a selected temperature above the softening temperature of the foliage, the selected temperature being high enough to give the desired bond strength; and
 (d) recovering the hot-pressed composite wood product.

The invention includes the resulting hot-pressed composite wood product comprising wood and wood adhesive, greater than 95% of the active wood adhesive being subdivided foliage which has been heat-softened and bonded under pressure.

The invention also includes an adhesive composition for bonding wood comprising
 (a) subdivided foliage, and
 (b) one of (i) an aqueous alkaline liquid, and (ii) a formaldehyde crosslinking agent.

The composites of the invention are probably most suitable for uses such as particleboard, waferboard, hardboard (fiberboard), wall panels or ceiling tiles, insulation panels, composite hardwood flooring, furniture components etc.

In the accompanying drawing, FIG. 1 is a graph showing the heat softening behaviour for wood, bark and foliage at three moisture levels.

DETAILED DESCRIPTION AND EXAMPLES

Moisture Absorption

One of the important parameters related to the use of each tree component for composite-product manufacture is the moisture absorption. To examine the moisture absorption, wood, bark and foliage from the same tree of Douglasfir (softwood) and red alder (hardwood) were obtained. The wood, bark and foliage were over dried at 105° C. to reach 0% moisture content, then ground to pass a 50 mesh screen.

The powder samples were spread on a Syracuse watch glass and stored in humidity chambers at 80° F. dry bulb, 40° F. Dew point (5.6% EMC Room) and 70° F. dry bulb, 57° F. Dew point (12% EMC Room) for one week. The percent moisture contents of the samples were then determined and expressed on an oven-dry weight basis as shown in the following table: (EMC; Equilibrium moisture content)

TABLE 1

| | Moisture Content (%) on Absorption | | | | | |
|---|---|---|---|---|---|---|
| | 5.6% EMC | | | 12% EMC | | |
| Tree Species | Wood | Bark | Foliage | Wood | Bark | Foliage |
| Douglas-fir | 9.1 | 9.7 | 9.8 | 14.2 | 14.0 | 14.9 |
| Red alder | 8.7 | 9.3 | 10.6 | 13.3 | 14.0 | 17.6 |

Each value is the average of 4 samples.

The moisture contents of the three components of Douglas-fir under the two humidity conditions were essentially the same. The red alder foliage had a moisture content about 2 to 4% greater than the wood and bark. The results indicate that foliage should have good moisture retention properties, desirable in the wood adhesive context.

Thermal Properties

In addition to the above Douglas-fir and red alder materials, wood, bark and foliage of Western red ceder, western hemlock and big leaf maple were subjected to thermal softening analysis: a technique for examining the compressibility of materials under constant pressure (50 psi) and under a constant heating rate with observation of the flow or softening temperature of the material (Chow, S. and K. J. Pickles. 1971. Thermal softening and degradation of wood and bark. Wood and Fiber, 3(3):166–178). Great differences in the softening temperatures of wood, bark and foliage were observed, even though they had similar moisture content. The responses are almost identical for softwood and hardwoods; therefore, only the results of Douglas-fir are presented in FIG. 1.

As shown in FIG. 1, at a moisture content of 0%, wood and bark started to soften at 180° C. while the foliage showed an initial softening at 95° C., a difference of almost 90° C. As the moisture content of the material increased to the 9–10% range, the softening temperatures of the wood, bark and foliage were lowered to 155°, 120° and 60° C. respectively. At a moisture content of 14–15%, the softening temperatures of wood, bark and foliage were 95°, 70° and 45° C. respectively. At temperatures greater than the initial softening temperatures of foliage, the magnitude of foliage softening was several times greater than that of wood and bark.

These significant lower softening temperatures of foliage (in comparison to that of wood and bark) even in the 0% moisture content condition suggest considerable potential plasticization or adhesive properties for foliage, for bonding wood or bark to form composite products. This knowledge of the thermal softening temperature variation as shown in FIG. 1 provides the fundamental understanding of the necessary conditions for composite product pressing. For example, at the absolute dry condition of the materials the use of foliage as adhesive for bonding should require a pressing temperature of greater than about 100° C. at a heating rate of about 18° C./min; a decrease in the heating rate will lower the pressing temperature required slightly. At a moisture content of about 10–15%, the minimum plasticization temperature for pressing is in the range of about 50° C. to 70° C.

Further, this research showed that the foliage alone when heated gave two exothermic peaks in the 120° C. and 160° C. regions. These exothermic phenomena could be the result of complex reactions between the foliage chemicals which have relatively simple molecular structures i.e., between phenolic and carbohydrate precursors (Forrest, G. I. 1975. Polyphenol Variation in Sitka spruce. Can. J. Forest Res. 5. 26–37). With this knowledge of the thermal and chemical properties of foliage it appeared possible that foliage would have low enough plasticization temperatures to develop good flow and contact with the bonding substrate under heat and pressure. The subsequent exothermic reactions of the foliage with a sufficiently high kinetic energy supply could accelerate the auto-adhesion of foliage and also the formation of strong adhesion bonds in a foliage-wood system.

This hypothesis proved to be true according to the present invention; thus botanical foliage alone can be used as an adhesive, suitable in the form of either foliage powder or mixed in an aqueous liquid carrier, especially for use in bonding wood products.

The starting foliage need not be dried out or "dead" but can be in green condition. The foliage can be dried and ground or otherwise subdivided, or can be wet-ground to a mulch or slurry. The foliage can be obtained from any available plant source. Usually the foliage is most suitably obtained from evergreen or deciduous trees. Examples of trees with suitable foliage include pine, spruce, fir, hemlock, cedar, redwood, poplar, birch, maple, alder, elm and basswood.

The particle size of the foliage should be small enough to fill the interstices between the wood, i.e., between the surfaces of layers, veneers, wafers, particles etc. A suitable foliage particle size is usually from about 10 to about 500 micrometers diameter, preferably about 50 to 400 micrometers. The particle size is not critical. Mixtures of different foliages can be used and in some cases are desirable. Thus a desirable balance of properties can be achieved from foliage combinations.

The foliage adhesive is mixed with or applied to the wood similarly to other wood adhesives, either as a powder or in a liquid carrier. The liquid carrier may be water or any aqueous liquid. The amount of foliage dispersed in the liquid carrier would suitably be about 20 to 60% by wt. but this is not critical. This amount will be chosen to give a desirable viscosity for spreading or spraying.

The amount of foliage applied as adhesive can vary widely. Some bond strength between the wood is developed with amounts as low as 1% wt. foliage (based on total wt. of composite). Since foliage itself is inexpensive, amounts as high as 60% or 80% have been used and may be feasible in some cases. The usual range is from about 15 to about 50% foliage, preferably about 20–40%.

The pressing temperatures for such composites will usually be within about 120° C. and 250° C. but higher or lower temperatures can be used in certain cases. As discussed above, temperatures as low as 45°–50° C. can be used at moisture contents near 15%. Pressures during pressing are desirably within the range from about 100 to about 600 psi. There is usually no advantage in exceeding about 600 psi and pressures as low as about 50 psi will give densities and strengths adequate for some applications. The moisture content of both the foliage and the wood should preferably be within the range about 5–15% by wt. at pressing. The moisture is transferable between the wood and foliage and either one can be dryer than about 5%. Thus, dry foliage powder will give good results with wood of 10% moisture content. Allowances can be made for a wide variation in moisture content of each component so that moisture content is not critical.

As illustrated below, the dimensional stability and water resistance of the foliage-wood composite can be considerable especially when suitable pressing conditions are chosen. As shown in Examples 1 and 4, composites can be prepared which will stand up reasonably well to 2 hours in boiling water. This water resistance approaches that needed for exterior-grade boards. If desired, the water-resistance can be improved by incorporating before pressing water-resistant additives such as fatty acids or wax materials.

It is possible to treat the foliage or the foliage-wood mixture to enhance the adhesion (see Example 8) on subsequent hot pressing. The addition of formaldehyde (in any form able to react and crosslink), has been found to increase the strength of the final composite. A suitable concentration range for formaldehyde is from about 1% to about 20% by wt. of the adhesive.

The natural pH of foliage is acidic, usually within the range 3.7 to 5.7. Increased internal bond strengths have been observed when the adhesive pH is raised to neutral and especially to alkaline values, e.g., of 10–12. Alkali metal or alkaline earth metal hydroxides are very suitable for this purpose. The addition of from about 1% to about 5% by wt. sodium hydroxide (based on the weight of the composite) or the equivalent, is preferred.

The following examples are illustrative.

EXAMPLE 1

Foliage Adhesive Potential

This experiment was designed to demonstrate the adhesive potential of foliage alone without the addition of a synthetic adhesive as in application Ser. No. 771,992. Dry Douglas-fir wood meal, moisture content about 6%, was used as the particleboard substrate for bonding. The board was prepared with the white spruce foliage contents of 0, 20, 40, 60, 80 and 100%. A total of a 1000 g of furnish (15.5×15.5×0.25 in) was pressed at 425 psi and 150° C. for 3 mins. The press temperature was then shut off and the board allowed to cool to about 52° C. with pressure being allowed to reduce on its own for about 4 hours before removal from the press. This was done to avoid the blister phenomena and allow a more representative examination of the adhesive potential of the foliage. Two boards were made for each foliage concentration. Three internal bond specimens (2×2 in), two bending strength specimens (2×10 in) and three specimens (3×2 in) for dimensional stability and moisture absorption test were prepared. The results are shown in Table 2.

TABLE 2

| Foliage Concentration (%) | Internal bond str. (psi) | MOR | 48 hours soak | | |
|---|---|---|---|---|---|
| | | | L (%) | T (%) | M.C. (%) |
| 0 | 0 | 175 | board dissolved | | |
| 20 | 94 | 1210 | 11.40 | 152 | 128 |
| 40 | 210 | 3334 | 0.29 | 33 | 27 |
| 60 | 205 | 2870 | 0.45 | 45 | 37 |
| 80 | 201 | 1282 | 0.82 | 71 | 51 |
| 100 | 220 | 1765 | 0.01 | 1.2 | 7.4 |

MOR = Modulus of Rupture
L = Linear expansion
T = Thickness swelling
M.C. = Moisture content The 100% foliage content specimens after the 48 hours water soak were further subjected to 2 hours boiling in water. The moisture absorption of the specimens was 15.7% while the linear expansion and the thickness swelling were 1.44 and 19.8% respectively. The specimens after boiling were air-dried for 2 weeks and their internal bond strength tested. The internal bond strength averaged 59 psi.

The above results show that foliage alone without the addition of synthetic resin can develop strong adhesive properties. The adhesive bonding has water resistance. As also shown by the 2 hours boiling in water of the 100% foliage board, the foliage board demonstrated the property of boiling water-resistant bonding which is normally accepted as exterior-grade bonding. This will be further explored in Example 4.

EXAMPLE 2

Foliage Content and Board Strength

To further demonstrate the adhesive properties of foliage, western red ceder, Douglas-fir, white spruce and lodgepole pine foliages were used. Fine Western hemlock sawdust which had been dried to a moisture content about 2.5% over-dry weight, was prepared. The foliage was first dried to about 0% moisture content and then ground in a Wiley mill to pass a 30 mesh screen. The foliage concentration in the particleboards ranged from 0 to 40% based on the total weight of the board. Each of the two 15×15 inch boards was pressed at 150° C. for 6 mins to a thickness of 0.25 inch giving a density of about 1. Six, 2×2 inch specimens for internal bond strength testing were cut from each board and tested. The average internal body strengths of the boards are shown below:

TABLE 3

| Foliage concentration (%) | Internal bond strength (psi) | |
|---|---|---|
| | W. red cedar | D. fir |
| 0 | 0 | 0 |
| 1 | 30 | — |
| 5 | 60 | 20 |

TABLE 3-continued

| Foliage concentration (%) | Internal bond strength (psi) | |
|---|---|---|
| | W. red cedar | D. fir |
| 10 | 65 | 53 |
| 15 | 100 | 65 |
| 20 | 95 | 79 |
| 30 | 105 | 99 |
| 40 | 95 | 67 |

The boards with the foliages of white spruce and lodgepole pine were only made with 20% foliage content in the sawdust board. The internal bond strengths obtained were 62 and 54 psi respectively for the white spruce and lodgepole pine boards.

The experimental results demonstrate that the adhesive property of foliage of different tree species and the foliage-wood bond can form in a short pressing time with the foliage content as low as 1%.

EXAMPLE 3

Improvement of Bond Strength by Increasing the Pressing Energy

Pressing temperatures of 150° and 200° C. were used with a pressing time of 6 mins to give a 0.25 inch thick board with a density of 0.9 to 1.0. Douglas-fir, white spruce and lodgepole pine foliages were used. Twenty percent of dry powdered foliage was mixed in hemlock sawdust (6% moisture content). Two, 15×15 inch boards were made for each experimental condition. Three specimens for internal bond strength test and two specimens for bending strength test were cut from each board.

The average bending and internal bond strengths are shown below:

TABLE 4

| Foliage Species | Internal bond (psi) | | Bending strength (psi) | |
|---|---|---|---|---|
| | 150° C. | 200° C. | 150° C. | 200° C. |
| Douglas-fir | 79 | 182 | 1787 | 3383 |
| White spruce | 62 | 126 | 1182 | 2501 |
| Lodgepole pine | 54 | 96 | 962 | 2555 |

The above results demonstrate that the strengths of foliage-wood boards increase with an increase in pressing temperature. This suggests that the foliage adhesive properties improve with an increase in input pressing energy.

EXAMPLE 4

Durability Tests of Foliage-Wood Board

The durability nature of the foliage-wood boards was examined making boards at a constant press temperature but using different press times. Foliage-wood boards were pressed at 200° C. and 425 psi for 5, 10, 15, 20, 25, 30 and 60 mins. The white spruce foliage used had a powder content in the Douglas fir wood meal board of 20%. Two boards were made for each pressing time. The density of the boards was 0.9 to 1. Each board was cut so that 4 bending strength specimens and 6 specimens for internal bond tests were obtained.

The following tests were done:
1. Bending tests while the specimens were dry and also after 2 hours boiling in water.
2. Internal bond strength tests while specimens were dry and also dried at 60° C. overnight after 2 hours boiling in water.

3. Moisture content and dimensional change measurements were made on previously tested (1) dry bending test specimens after soaking in water for 24 hours at 20° C.

The test results are given in Tables 5 and 6.

These results demonstrate that when suitable pressing schedules (time-temperature combination) provide sufficient energy, a durable foliage-wood board can be prepared which will stand up to boiling water treatment.

EXAMPLE 5

The Moisture Content of Wood Particles and the Temperature of Board Formation and the Internal Bond Strength This experiment was designed to examine the pressing schedule especially the temperature and pressure influence on foliage particleboard formation when Douglas-fir shavings which had a relatively high moisture content of about 19% were used. The shavings were mixed with oven-dry Douglas-fir foliage powder (passed 30 mesh size) at a 20% foliage concentration. The press temperature was set for 300° F. (150° C.) and

TABLE 5

| Press time | Board Strength | | | |
|---|---|---|---|---|
| | Internal bond (psi) | | MOR (psi) | |
| (min) | dry | boiled | dry | boiled |
| 5 | 48(31)* | — | 1011 | — |
| 10 | 92(28) | — | 2130 | 79 |
| 15 | 76(28) | 2(1) | 2246 | 219 |
| 20 | 175(46) | 12(8) | 2607 | 352 |
| 25 | 139(61) | 6(2) | 2570 | 261 |
| 30 | 134(46) | 18(11) | 2265 | 948 |
| 60 | 149(5) | 47(16) | 2110 | 903 |

*Standard deviation.

TABLE 6

| Press time | Dimensional Stability | | | | | |
|---|---|---|---|---|---|---|
| | 24 hours soak | | | 2 hours boil | | |
| (min) | L (%) | T (%) | MC (%) | L (%) | T (%) | MC (%) |
| 5 | 5.50 | 118 | 135 | — | — | — |
| 10 | 1.06 | 33 | 40 | 3.36 | 107 | 120 |
| 15 | 0.92 | 30 | 35 | 2.73 | 86 | 105 |
| 20 | 0.78 | 24 | 34 | 1.96 | 63 | 80 |
| 25 | 0.56 | 20 | 22 | 2.22 | 59 | 88 |
| 30 | 1.32 | 37 | 42 | 1.20 | 40 | 55 |
| 60 | 0.53 | 12 | 21 | 1.01 | 30 | 40 | the initial pressure was 400 psi. A thermocouple was inserted in the center of the board and the board was pressed to the desired temperature. The pressure was then released in steps of 50 psi each minute until the pressure reached 0 and the press was then opened. The desired temperatures were 140°, 120°, 100°, 80° and 60° C.

The results of this experiment are shown in the following Table 7.

TABLE 7

| Center board temp. (°C.) | Total press time (min) | Internal bond (psi) | Modulus of rupture (psi) |
|---|---|---|---|
| 140 | 8.5 | 84 | 3129 |
| 120 | 8 | 90 | 2091 |
| 100 | 7 | 61 | 2278 |
| 80 | 7 | 60 | 1847 |

TABLE 7-continued

| Center board temp. (°C.) | Total press time (min) | Internal bond (psi) | Modulus of rupture (psi) |
|---|---|---|---|
| 60* | 4 | 26 | 1016 |

*The pressure was dropped to 200 psi and the press was opened.

The results of this experiment showed that a strong foliage-wood board can be produced with a combination of pressing schedules. Even when the center temperature of the board is 60° C., the wood shavings can form a board with modulus of rupture approaching 1000 psi.

The experimental results confirm the softening temperature data (e.g., FIG. 1) which indicated that when the foliage moisture content is about 15% or more, the foliage can flow or become plasticized at pressing temperatures as low as 45° C. Since the wood particles used in Example 5 had a moisture content of 19%, the energy can be easily transferred to the whole foliage-wood system and thus at 60° C., the foliage adhesive properties were well developed.

EXAMPLE 6

In another experiment, instead of 19% moisture content in the wood shavings, wood shavings with 9% moisture content were used. The Douglas-fir wood shavings were mixed with 20% Douglas-fir foliage and the mixture then was pressed to a density of about 1 and a thickness of 0.25 inch. The pressing conditions were: (a) the board was made at a pressing temperature of 175° C. and pressure of 400 psi for 1 min and then pressure was dropped 100 psi for 2 mins before press opening; (b) the boad was made at a pressing temperature of 175° C. and pressure of 400 psi for 1½ mins and then the pressure was dropped to 100 psi for 1½ mins before the press opening. In the above pressing conditions, the board center temperature after 1 min pressing was about 110° C. which is higher than the softening temperature of foliage but below the initial softening temperature of bark and wood. The resulting internal bond strength for the two pressing conditions were 45 and 56 psi, respectively for the conditions of (a) and (b). The MOR for the boards were 1283 and 1319 psi, respectively for the (a) and (b) boards.

EXAMPLE 7

Whole Tree Board

Since the foliage adhesion principle was established, it was worthwhile to try to bond whole tree components without the use of synthetic resin. The whole tree components included foliage, bark and wood.

Five-year-old red alder trees which contain about 15 to 30% of foliage, were cut and dried in an oven at 105° C. to have a moisture content of about 1.5% based on oven-dry weight. This combined material was then ground in a Wiley mill. The wood and bark slivers produced had an average of 0.25 inch length and 0.06 inch width. The whole mass was then pressed at 150° C., 180° C. and 200° C., respectively for 6 mins. The board thickness was 0.5 inch and its density was 0.9 to 1.0.

Tests on the resulting boards showed that the internal bond strengths were 63, 45 and 129 psi and the modulus of rupture in bending were 1664, 1562 and 1050 psi respectively for the pressing temperatures of 150° and 180° and 200° C.

This experiment demonstrates that the use of foliage as adhesive can extend to whole tree bonding including bark and wood.

EXAMPLE 8

Effect of Formaldehyde and Caustic on Foliage Adhesion

Using the identical pressing conditions as in Example 2, particleboard having the following material constituents were made:

(a) 10% of dry cedar foliage powder in the hemlock sawdust board;

(b) 10% of a cedar foliage-paraformaldehyde mixture in the hemlock sawdust board. The foliage-formaldehyde mixture added had 10% of paraformaldehyde content.

(c) 10% of cedar foliage mixed in the same sawdust and then the mixture sprayed with 10% of the weight of board of sodium hydroxide-water solution (10% caustic content).

(d) 10% cedar foliage mixed in the same hemlock sawdust and the mixture sprayed with 10% of the weight of board of sodium hydroxide solution (30% caustic content).

The results showed that the internal bond strengths were 52, 92, 84 and 200 psi, respectively for boards of (a), (b), (c) and (d). This example demonstrated that the addition of formaldehyde and caustic water enhanced the foliage adhesion on subsequent hot pressing.

EXAMPLE 9

Foliage Glue Adhesion in Plywood Type Lamination

To simulate a plywood-type glue, 400 g of Douglas-fir foliage powder (passed 30 mesh) was mixed in water (800 g) and sodium hydroxide (96 g) solution to give 8% sodium hydroxide content. The pH of the adhesive mixture was 12; this glue was spread on white spruce veneers with 30 pounds per thousand square feed of double glueline. They were allowed to have an open assembly time of 5 mins and then were pressed at 150° C. for 12 mins at 200 psi. The internal bond strength of the 5-ply plywood laminations was tested according to particleboard specifications and was found to be an average internal bond strength of 70 psi (plywood density was about 0.45). This example demonstrated that the foliage adhesive can be prepared as liquid glue for bonding.

I claim:

1. A method of bonding wood or bark to form composite products comprising:
   (a) subdividing plant foliage to a fine particle size;
   (b) uniformly contacting the wood or bark to be bonded with adhesive which consists essentially of one of,
      (i) said subdivided foliage,
      (ii) said subdivided foliage with up to 20% formaldehyde by weight of the adhesive, and
      (iii) said subdivided foliage having its natural acid pH raised to neutral or alkaline pH, said adhesive being present in sufficient amounts to bond the wood or bark,
   (c) subjecting the crude composite to bonding pressure at a selected temperature above the softening temperature of the foliage, the selected temperature being high enough to give the desired bond strength; and
   (d) recovering the hot-pressed composite wood or bark product.

2. The method of claim 1 wherein the hot-pressing temperature is selected from within the range of 45° to 250° C.

3. The method of claim 1 wherein the hot-pressing pressure is from about 50 to about 600 psi.

4. The method of claim 1 wherein the amount of the foliage is within about 15% to about 80% by wt. of the composite.

5. The method of claim 1 wherein the amount of the foliage is from about 20% to about 40% of the composite.

6. The method of claim 1 wherein the foliage in step (b) is in the form of a dispersion in an aqueous liquid carrier.

7. The method of claim 1 wherein the foliage in step (b) is in the form of a free-flowing powder.

8. The method of claim 1 wherein the foliage is selected from evergreen foliage, deciduous tree foliage and mixtures thereof.

9. The method of claim 1 wherein the foliage or a mixture of foliages is selected for a particular combination of properties.

10. The method of claim 1 wherein the foliage is bonded at neutral or alkaline pH.

11. The method of claim 1 wherein the formaldehyde cross-linking agent is incorporated before bonding.

12. A hot-pressed composite wood or bark product comprising wood or bark and wood adhesive, said wood adhesive consisting essentially of one of
   (i) subdivided foliage,
   (ii) said foliage with up to 20% formaldehyde by wt. of the adhesive, and
   (iii) said foliage having its natural acid ph raised to neutral or alkaline pH said foliage being heat-softened and bonded under pressure.

13. The composite wood product of claim 12 wherein the foliage is selected from evergreen foliage, deciduous tree foliage and mixtures thereof.

14. The composite wood product of claim 12 wherein the foliage is present in amounts within about 15 to about 80% by wt. of the composite.

15. The composite wood product of claim 12 wherein the foliage is present in from 20% to about 40% by wt. of the composite.

16. The composite wood product of claim 12 wherein the adhesive wave bonded at alkaline pH.

17. The composite wood product of claim 12 wherein the internal bond strength is increased by formaldehyde crosslinking.

* * * * *